No. 660,950. Patented Oct. 30, 1900.
B. COX.
CORN PLANTER.
(Application filed Aug. 3, 1900.)
(No Model.) 2 Sheets—Sheet 1.
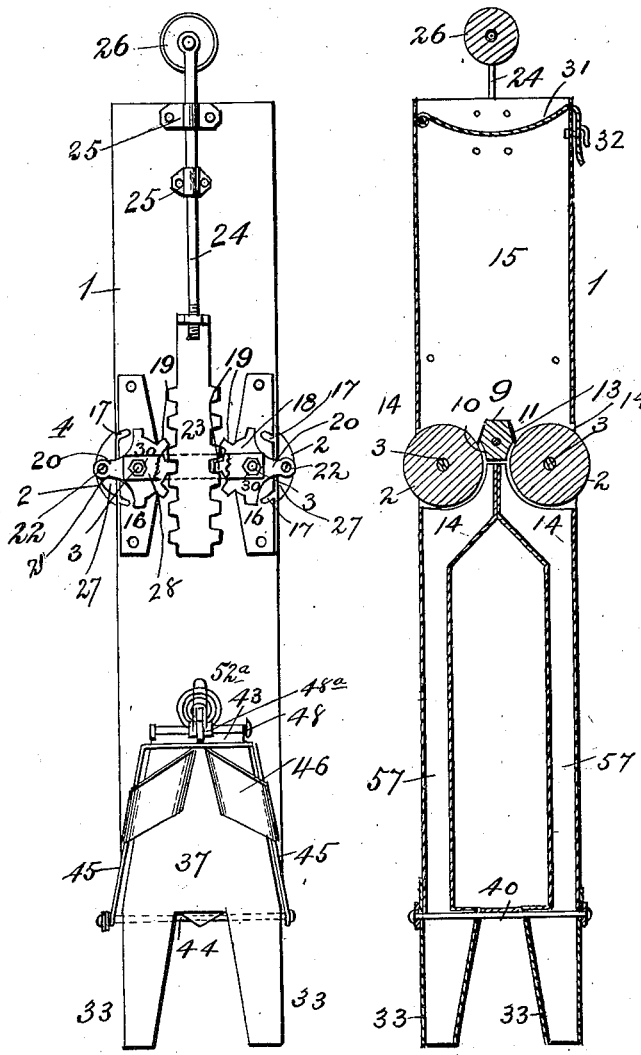
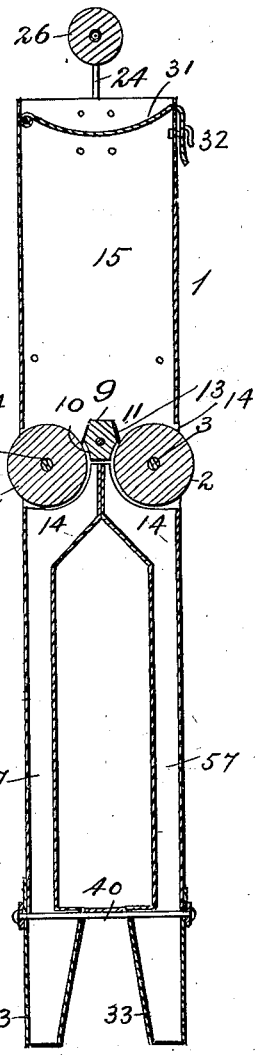
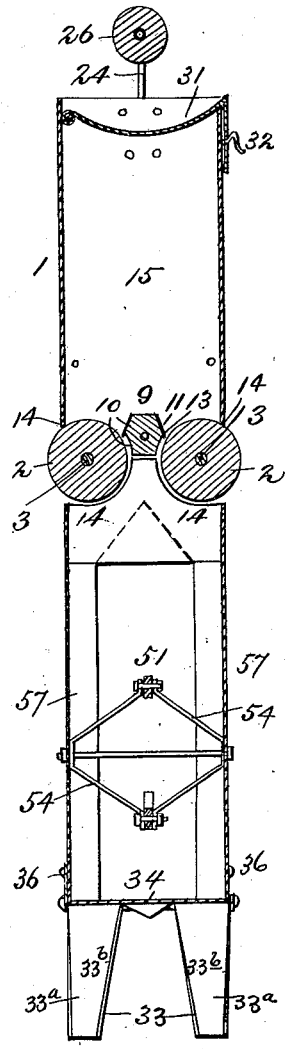
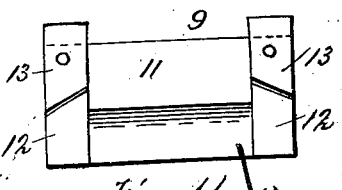
WITNESSES:
F. L. Ourand
F. G. Radelfinger
INVENTOR:
Byron Cox.
BY
ATTORNEYS.
THE NORRIS PETERS CO., PHOTO-LITHO., WASHINGTON, D. C.

No. 660,950. Patented Oct. 30, 1900.
B. COX.
CORN PLANTER.
(Application filed Aug. 3, 1900.)
(No Model.) 2 Sheets—Sheet 2.
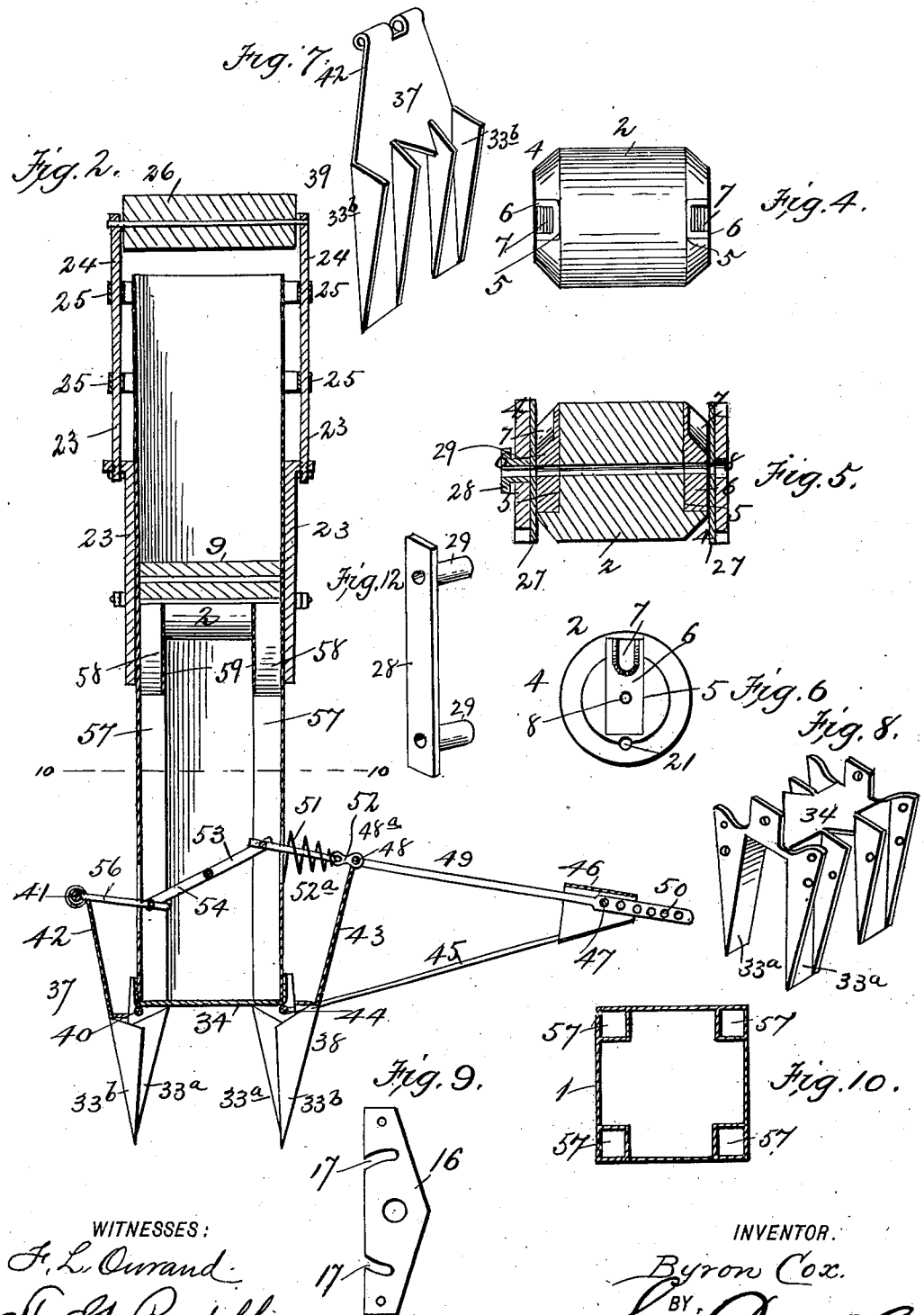
WITNESSES:
F. L. Ourand
F. G. Radelfinger
INVENTOR.
Byron Cox.
BY
Louis Bagger & Co.
ATTORNEYS

UNITED STATES PATENT OFFICE.

BYRON COX, OF EVART, MICHIGAN.

CORN-PLANTER.

SPECIFICATION forming part of Letters Patent No. 660,950, dated October 30, 1900.

Application filed August 3, 1900. Serial No. 25,781. (No model.)

*To all whom it may concern:*

Be it known that I, BYRON COX, a citizen of the United States, residing at Evart, in the county of Osceola and State of Michigan, have invented new and useful Improvements in Corn-Planters, of which the following is a specification.

My invention relates to corn-planters of the type which are operated by hand.
The object of the same is to provide a device of this character which will be light in construction and simple and efficient in operation, one by which corn or grain of any size can be planted in all kinds of soils to any depth desired. By the use of my improved planter corn can be planted at a uniform depth and at a uniform distance apart and the yield of the land greatly increased. I can make my planter of any size desired; but my standard size will be about four by four inches. They may be made of any size from one by one to twelve by twelve, inclusive. In making the extreme sizes the bottom part only of my planter would have to be increased or diminished. The feed mechanism would be the same for all.

I do not wish to be limited as to details of construction, as these may be modified in many particulars without departing from the spirit of my invention.

In the drawings which accompany this specification and of which they form a part, Figure 1 is a front elevation of my planter. Fig. 2 is a longitudinal section of the same parallel allel to the rollers. Fig. 3 is a longitudinal section of the same transversely to the rollers. Fig. 3ª is a longitudinal section of the same transversely to the rollers and showing the operating-levers for the dibbles. Fig. 4 is a detail elevation of one of the feed-rollers. Fig. 5 is a detail section of the same. Fig. 6 is an end elevation of the same. Fig. 7 is a perspective of one pair of dibble-jaws. Fig. 8 is a perspective of the bottom plate and the four inner jaws. Fig. 9 is a side elevation of one of the bearing-plates. Fig. 10 is a transverse section through the grain-chutes. Fig. 11 is a side elevation of the guard-block. Fig. 12 is a detail of the bearing-plates.
ing-plates.

In the drawings like numerals of reference denote like parts wherever they occur.

The numeral 1 designates the tube or outer casing in which the mechanism of my planter is mounted.

My device may be divided into two parts— the feed mechanism and the dropping or planting mechanism. The feed mechanism will be first described.

The feed-rollers 2 are mounted on shafts 3, extending through the walls of the rectangular tube 1. These rolls may be made of any material. I make them of wood. They are turned off or coned on the edges at 4 to form guides for the grain and are transversely grooved at each end at 5. Fitting these grooves 5 are removable blocks 6, the outer surfaces of which are level with the ends of the rolls 2, and each is provided with a seed-chamber 7. This chamber 7 is just large enough to accommodate the amount of seed to be sown. This quantity can be varied by substituting blocks with chambers of a different size. It is my intention to fit out my planters with three different sets of blocks. These blocks 6 are bored at 8, and the apertures register with the bore of the roller, so the shaft 3 passes straight through and holds the blocks in position. A guard-block 9 extends transversely the tube and is cut away at 10 to fit the tops of the rollers 2 and beveled at 11 to prevent the corn from piling up on it. Small notches are formed in this guard-block at 12, and secured in said notches are triangularly-pointed guards 13, which fit snugly the coned portion of the rollers and prevent grain from entering the grain-chambers 7 except when the chambers are turned up. The tube 1 is cut away to accommodate the feed-rollers, and the upper edges 14 thereof fit snugly the rollers. The upper part of the tube 1 thus forms a grain-tight hopper 15.

The shafts 3 are journaled in bearing-plates 16, attached to the metal of the tube 1. These bearing-plates 16 are cut away at 17, forming curved slots to permit the movement of rocking gears 18. Loosely mounted on the ends of each shaft 3 are the segmental or rocking gears 18. These gears are each provided with a set of cogs 19 and arm 20, apertured at 21. Bolts or screws 22 are inserted in the aperture 21 and extend into the rollers at a point near the periphery. I may dispense with the screws 22 by keying the gears 18 on the shaft;

but the above-described arrangement gives more latitude for adjustments. The cogs 19 of the pairs of rocking gears 18 face each other and mesh with rack-bars 23, which extend down between them. This pair of rack-bars are secured at their upper ends to rods 24, which slide in guides 25 and are in turn secured to a handle 26. The combination of the rocking gears, rack-bars, and handle forms efficient means for operating the feed mechanism. In order to render the feed apparatus more complete mechanically, plates 27 are inserted between the casing and the ends of the rollers to prevent wear, and apertured straps 28, having sleeves 29 secured thereto, which are fitted over the ends of the shafts 3, the sleeves extending through the rocking gears, which are bored larger than the shaft, thereby forming a stronger and more perfect bearing. Nuts 30, fitting the ends of the shafts 3, serve to regulate the bearings and tie the structure together. The top of the hopper 15 is closed by a door 31, fastened by a hasp and latch 32.

The dropping mechanism is situated at the bottom of the tube 1. There are four dropping-shoes or dibbles 33, one situated at each corner of the tube 1. Each dibble 33 is formed by the combination of two jaws $33^a$ and $33^b$. The jaws $33^a$ are stationary and are adapted to be formed integral with the bottom 34 of the tube 1. This bottom 34 is of sheet metal and is cut and bent to form the jaws $33^a$ of the dibbles 33 and then secured to the tube 1 by rivets or screws 36. The jaws $33^b$ are formed in pairs integral with two other pieces of sheet metal 37 and 38. The sheet 37 is cut out and bent over at 39 to form the jaws $33^b$, which are made slightly longer than their companion jaws $33^a$ to obviate the danger of pulling the corn out of the ground in tilting the planter. The jaws $33^b$ are pivoted on a pintle 40, which extends across and ties the side members of the jaws together. The member 37 extends upward and has a pintle 41 secured in its upper end 42 to serve as a hinge for the operating mechanism. The member 38 is shaped the same as 37, with the exception that the jaws $33^b$, formed thereon, may be of the same length as the jaws $33^a$, with which they correspond, and the top portion 43 is longer than the portion 41. The jaws $33^b$, formed on the member 38, are pivoted on a pintle 44, which extends transversely the tube and supports on its outer ends the side members of a yoke 45 of the operating mechanism. The yoke 45 has secured to its outer end a guide 46, fitted with a bolt 47. This combination of guide member and yoke forms a foot for operating the planter. Secured to the top 43 of member 38 is a pintle 48, which has pivoted thereon at $48^a$ an arm 49. This arm is fitted with a series of perforations 50. It extends through the guide 46 and is secured by the bolt 47. The holes 50 are used for adjusting purposes and are all adapted to fit the bolt 47. By this means the end of the yoke or foot can be raised or lowered. Also pivoted on the pintle 48 is a connecting-rod 51, having a U-shaped head 52, against which a spring $52^a$ bears. This connecting-rod is oppositely connected to one arm of a lever 53, having expanded side members 54 and a shaft 55, journaled in the casing. The opposite arm of the lever 53 is connected to a connecting-rod 56, which is reversely pivoted on the pintle 41. It is easily seen that when the foot is raised the lever and connecting-rods will be actuated and the jaws of the four dibbles opened simultaneously. I may add braces to the members 37 and 38 if it is found necessary.

Grain tubes or chutes 57 are provided one for each dibble. These tubes extend upward and are connected to the curved chute-planes 58, provided with sides 59. This combination of tubes and chute-planes conducts the grain from the rollers to the dibbles.

In planting corn the lid is first opened and the hopper 15 filled with corn. The handle 26 is now pulled up to its highest point, with the upper ends of the racks abutting the guides 25. The corn will then run down and fill the grain-chambers 7. The planter is now forced into the ground by pushing the handle 26 down. The feed-rolls 2 will be turned one-half of a revolution, the corn emptied out of the chambers into the tubes 57, and will run down into the dibbles. The planter is now tilted slightly and the outer end of the yoke or foot, which has been adjusted at any height desired by means of the holes 50, brought into contact with the ground. This will actuate the lever and connecting-rods, open the jaws $33^a$ and $33^b$ of the dibbles, and release the corn. Since the jaws $33^a$ are shorter than the jaws $33^b$ of the dibbles on the side tilted up, there is no danger of pulling the grain out of the ground. The jaws of the dibble will be closed and held so by the action of the spring $52^a$ after each operation of planting. The foot marks the position of the next hill of corn and the operation can be repeated.

Having thus described my invention, what I claim as new, and wish to secure by Letters Patent, is—

1. The combination with the tube of the two pairs of dibbles having pivoted jaws, the pintles connecting said pivoted jaws in pairs, the yoke mounted on one of said pintles, the adjustable arm connecting one pair of said pivoted jaws to the outer end of said yoke, and the lever connected to communicate the motion of one pair of pivoted jaws to the other pair.

2. In a planter, a plurality of dibbles, the stationary jaws of which are all formed of, and integral with, a single piece of sheet metal suitably shaped, substantially as described.

3. In a planter, dibbles, the pivoted or movable jaws of which are formed in pairs of, and integral with, a single piece of sheet metal suitably shaped, substantially as described.

4. In a planter, the combination, substantially as described, of a pair of feed-rolls mounted to be revolved, and provided with seed-chambers, the gears, a rack-bar provided with cogs on both sides mounted intermediate said gears and constructed to mesh therewith to revolve said rolls.

In testimony whereof I have hereunto set my hand in presence of two subscribing witnesses.

BYRON COX.

Witnesses:
O. MORTON,
FRED. W. LEWIS.